July 15, 1958 G. L. SCHNABLE ET AL 2,842,841
METHOD OF SOLDERING LEADS TO SEMI-CONDUCTOR DEVICES
Filed June 13, 1955

INVENTORS
JOHN ROSCHEN
GEORGE L. SCHNABLE
BY
*Carl H. Synnestvedt*
AGENT

United States Patent Office 2,842,841
Patented July 15, 1958

2,842,841

METHOD OF SOLDERING LEADS TO SEMI-CONDUCTOR DEVICES

George L. Schnable, Lansdale, and John Roschen, Hatboro, Pa., assignors to Philco Corporation, Philadelphia, Pa., a corporation of Pennsylvania Application June 13, 1955, Serial No. 514,812

3 Claims. (Cl. 29—495)

The present invention relates to a novel method of joining articles by means of molten metal, and, more particularly, it relates to a novel method of soldering metal members.

In the manufacture of parts for electrical and electronic equipment, particularly semi-conductor devices, for example, it is necessary to solder a "whisker" wire to an indium electrode which has been alloyed into a germanium wafer base. While the method of the invention is of broader applicability, it is especially useful in the making of joints of the kind above mentioned, and it is the principal object of this invention to provide a novel method of joining or soldering.

Another object is to provide a novel and very rapid method of soldering metal members in the mass production of electrical and electronic assemblies.

A further object of the present invention is to provide a novel method for soldering, involving the use of a low melting point alloy as the bonding agent.

In the achievement of the foregoing objectives this invention provides a method wherein parts or members to be joined are placed in juxtaposition with a heat-fusible bonding material contacting said parts, this step being followed by immersing of the aforementioned parts, together with the bonding material, in a suitable fluxing bath maintained at a temperature elevated sufficiently to cause the bonding material to melt, said temperature being below that value causing deterioration of the parts to be bonded. In short, this invention provides a novel method of soldering, wherein hot flux provides the heat required to melt the solder.

As used hereinafter, the terms "solder," "soldered," "soldering," "bonding," and the like are concerned with the joining of solid members or articles, either metallic or nonmetallic, preferably the former, by means of molten metal permitted to solidify while resting at the juncture of the members to be joined. As hereinafter shown and described, and by way of example only, the members to be joined comprise a transistor lead wire (solder attached) and a germanium wafer with its indium electrode attached; the lead wire in this instance is to be soldered to the indium electrode.

A method including use of a solder alloy suitable to the method of this invention, is disclosed and claimed in the copending application of George Schnable, Serial No. 510,536, filed May 23, 1955, and assigned to the assignee of the present invention. As stated therein the members to be joined are brought together with an indium-cadmium alloy, in molten form, in bonding relationship therebetween. This alloy which is well adapted for use in the practice of this invention, may comprise 25% cadmium and 75% indium, by weight, this combination forming a eutectic mixture having a melting point of 122.5° C. Although it is preferred that a cadmium-indium alloy of the foregoing proportions be employed, it is to be understood that an alloy containing as little as 40% and as much as 80% indium, the remaining portions being cadmium, is satisfactory, depending upon the desired melting characteristics of the alloy. It is further to be recognized that, in the broader aspect of this invention, other solders may be used, although it is important to note that they should have a fusion temperature below the fusion temperature of the materials being joined and not in excess of the temperature which can be maintained in the flux bath.

As is usual in soldering operations, a suitable flux is employed to clean and facilitate wetting of the surface of metal members to be joined by the solder and, in particular accordance with the present invention, the same flux is employed to provide the reservoir of heat required to liquify the solder.

In practicing the method, and again with special reference to the manufacture of semi-conductor devices, the lead wire, with solder attached, is placed in contact with the electrode to which it is to be soldered. The solder is preferably of the mentioned composition, 75% indium-25% cadmium, this alloy having a melting point of approximately 122.5° C.; this solder is advantageously employed since the aforementioned indium electrode has a melting point of approximately 155° C. While maintaining the contact between the lead wire and the electrode, the transistor device is immersed in a bath of suitable fluxing material, which may, for example, comprise a 0.5 to 2.0% concentration of hydrochloric acid, by volume, in solution with propylene glycol. The bath is maintained at a relatively constant temperature, for example 135° C.±5° C. which is above that required for melting the solder (122.5° C.) and substantially below that causing deterioration of either the indium electrode or the flux bath itself. It should be understood that other fluxing liquids may be employed and that, regardless of the specific composition thereof, it should have a boiling point above the fusion temperature of the solder.

After the solder has melted, the device being soldered is removed from the flux bath, permitted to cool, and then submitted to a suitable rinsing action, followed by a clean-up etching bath. By the foregoing method the soldering temperature can be accurately controlled, and the operation can be performed in an inert atmosphere if so desired. It is most important to note that the method is advantageously adaptable to automatic production techniques.

In the accompanying drawings forming a part of the application and in which like numerals are employed to designate like parts:

Figure 1:
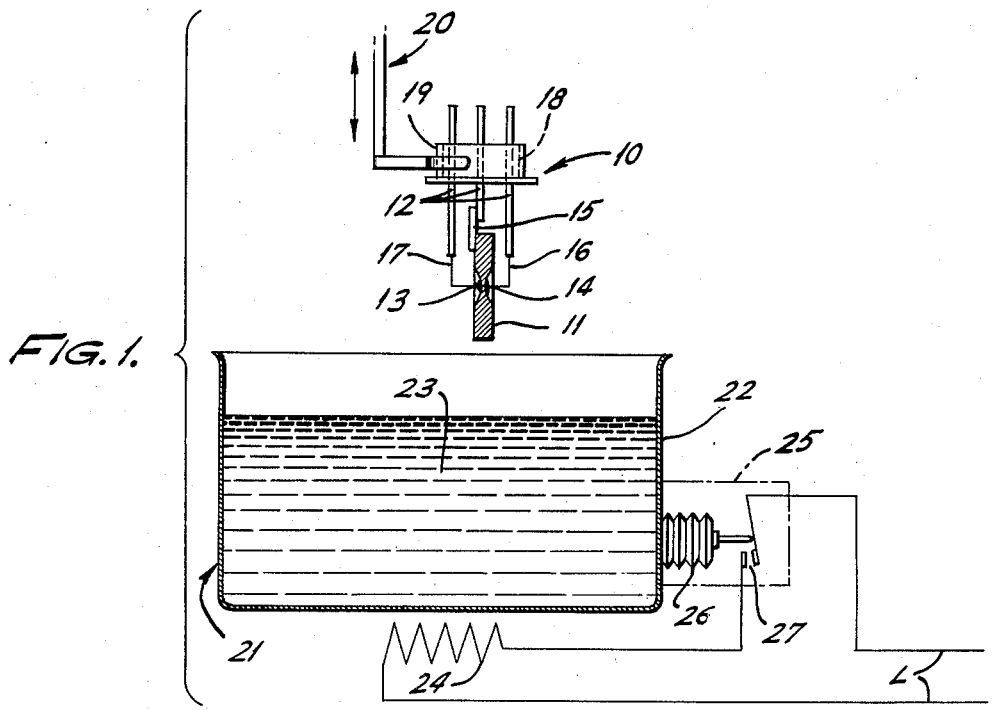
Figure 1 is a somewhat diagrammatic view of a simple form of apparatus for carrying out the method, and includes an elevational showing of one type of device which can be soldered by following the method of the present invention.

Referring more particularly to the drawing, there is shown in Figure 1 a well known type of transistor unit 10, the unit being shown without the hermetically sealed enclosure which normally houses the same. Included in the transistor unit 10 is the transistor element 11, which comprises a germanium wafer having indium electrodes 13 and 14, attached thereto. Supporting the transistor element 11 is the attached nickel electrode 15, which in turn is supported by one of three pins 12. Other pins 12 support whisker leads 16 and 17, each of said leads having an end portion in abutting relation to said indium electrodes 13 and 14, respectively. Each of the pins 12 is anchored in a member 18 of non-porous, non-conductive material, said member being sealed within a shell 19.

Simple means suitable to carry out the steps of the novel method of this invention include a vertically adjustable chuck 20 adapted to carry one or more units 10 to be soldered. Beneath the chuck 20 is a flux bath 21 including a suitable container 22 and liquid flux 23. Heat necessary to maintain the temperature of the liquid flux 23 at any desired value is supplied by the electric heater 24, the operation of which is regulated by a temperature-responsive element 25, said element being responsive to the temperature of the bath 21 through the agency of contact of bellows 26 with the container 22. Bellows 26 serves to open or close switch 27 arranged in series circuit relation with the heater 24, both said switch and said heater being connected across line L.

Figures 2, 3:
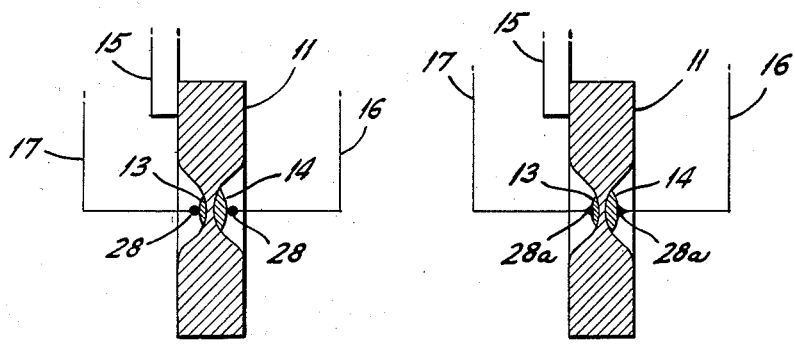
Figure 2 is an enlarged fragmentary view of the device to be soldered showing the physical relationship of elements prior to soldering.
Figure 3 is a view similar to Figure 2, and showing the relation of elements after the soldering operation.

In Figure 2 the solder 28, attached to and forming a part of each of the whisker wires 16 and 17, is shown abutting the indium electrodes 13 and 14 prior to initiation of the soldering operation. Solder attachment of the whisker wires 16 and 17 to the indium electrodes 13 and 14 is shown in Figure 3, wherein solder tips 28a are seen to have melted and effected the necessary bond between the wires and the electrodes.

In using the above described apparatus to practice the method of the invention, the liquid flux 23 in the flux bath 21 is brought up to and maintained at the temperature required for soldering, for example 135° C.±5° C. in the operation considered by way of example. The units 10 to be soldered, are placed in the supporting chuck 20. The chuck, with the units attached, is then lowered a distance sufficient to immerse the junction points in the liquid flux 23. The immersion time is sufficient to insure melting of the solder tips, after which the unit is withdrawn from the liquid flux and hardening of the solder occurs. Upon completion of the steps of the method, the device 10 is then available if desired, for other manufacturing procedures, such, for example, as flux removal by rinsing, or the application of a suitable clean-up etching solution.

From the foregoing description it will be appreciated that among the more important advantages of the novel method of this invention is the provision of an accurately controlled soldering, or bonding, method which permits uniform distribution of heat throughout the articles being joined. Also provided is an inherently rapid soldering method which is well adapted to the rapid pace of present day mass production methods, inasmuch as the method is adaptable to the soldering of a plurality of articles, these articles quite often being miniature in size such that conventional methods of soldering permitted but a single miniature article to be soldered at a time. Individual treatment of the type previously relied upon is tedious to the operator and requires utmost skill, in order that a uniform end product may result, particularly in the assembly of electronic components, such, for example, as the assembly of surface-barrier transistors. Still another advantage lies in the fact that the method of this invention can be carried out in an inert atmosphere, if such is desired.

A further advantage of the method lies in provision of a relatively constant temperature at which the soldering, or bonding, operation is performed; and it is to be understood that a desired operational temperature level can be maintained through selection of various solders and fluxes having known physical properties suitable to the method of the invention.

We claim:

1. In a method of fabricating a semiconductor device of the type including an indium electrode formed on a surface portion of a body of germanium, the steps which comprise: forming a bead of congealed indium-cadmium alloy solder on an end of a thin wire, the solder of said bead having a melting temperature below that of said electrode; and dipping the bead, while in contact with the electrode, in a liquid fluxing medium comprising propylene glycol containing, in solution, a flux which is non-deleterious to said semi-conductor device, while maintaining the temperature of the fluxing medium at a temperature between the melting temperatures of indium and of the indium-cadmium alloy.

2. In a method of fabricating a semi-conductor device of the type including an indium electrode formed on a surface portion of a body of germanium, the steps which comprise: forming a bead of congealed indium-cadmium alloy solder on an end of a thin wire, the solder of said bead having a melting temperature below that of said electrode; and dipping the bead, while in contact with the electrode, in a liquid fluxing medium comprising hydrochloric acid in propylene glycol, while maintaining the temperature of the fluxing medium at a temperature between the melting temperatures of indium and of the indium-cadmium alloy.

3. In a method of fabricating a semi-conductor device of the type including an indium electrode formed on a surface portion of a body of germanium, the steps which comprise: forming a bead of congealed indium-cadmium alloy solder on an end of a thin wire, the solder of said bead having a melting temperature below that of said electrode; and dipping the bead, while in contact with the electrode, in a liquid fluxing medium comprising a 0.5 to 2.0 percent concentration by volume of hydrochloric acid in propylene glycol, while maintaining said medium at a temperature between the melting temperatures of indium and of the indium-cadmium alloy.

References Cited in the file of this patent

UNITED STATES PATENTS

| | | |
|---|---|---|
| 2,191,631 | Shutts | Feb. 27, 1940 |
| 2,298,996 | Woods | Oct. 13, 1942 |
| 2,321,071 | Ehrhardt et al. | June 8, 1943 |
| 2,381,025 | Addink | Aug. 7, 1945 |
| 2,409,615 | Daniel | Oct. 22, 1946 |
| 2,735,050 | Armstrong | Feb. 14, 1956 |
| 2,746,140 | Belser | May 22, 1956 |

OTHER REFERENCES

Metals Handbook, 1939 edition, pages 317–321. Published by American Society for Metals, Cleveland, Ohio. Copy in Div. 14.